(12) United States Patent
Roh et al.

(10) Patent No.: US 9,123,388 B2
(45) Date of Patent: Sep. 1, 2015

(54) DISK DRIVE INCLUDING A NOISE REDUCTION UNIT AND METHOD OF REDUCING NOISE BY USING THE DISK DRIVE

(75) Inventors: Min-shik Roh, Seoul (JE); Se-yoon Kim, Seoul (KR); Bo-won Hwang, Suwon-si (KR); Byung-yeob Park, Suwon-si (KR); Dong-ha Jung, Yongin-si (KR); Ji-won Jung, Yongin-si (KR); Min-seok Ha, Seoul (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/277,332

(22) Filed: Oct. 20, 2011

(65) Prior Publication Data

US 2012/0102508 A1 Apr. 26, 2012

(30) Foreign Application Priority Data

Oct. 25, 2010 (KR) ........................ 10-2010-0104247

(51) Int. Cl.
*G11B 33/14* (2006.01)
*G11B 17/056* (2006.01)

(52) U.S. Cl.
CPC .......... *G11B 33/1486* (2013.01); *G11B 17/056* (2013.01); *G11B 33/148* (2013.01)

(58) Field of Classification Search
CPC ...... G11B 17/04; G11B 17/05; G11B 17/053; G11B 17/056; G11B 33/14; G11B 33/1406; G11B 33/1413; G11B 33/142; G11B 33/148; G11B 33/1486

USPC .................................. 720/600, 601, 648–651
See application file for complete search history.

(56) References Cited

U.S. PATENT DOCUMENTS

| 6,317,402 | B1 * | 11/2001 | Huang et al. ................... 720/603 |
| 2005/0015782 | A1 * | 1/2005 | Wang .............................. 720/603 |
| 2007/0006241 | A1 * | 1/2007 | Wang et al. .................... 720/611 |
| 2009/0235291 | A1 * | 9/2009 | Hayashi et al. ................ 720/603 |

FOREIGN PATENT DOCUMENTS

| JP | 2003085964 A | * | 3/2003 | ............. G11B 33/14 |
| JP | 2008016067 A | * | 1/2008 | |
| KR | 10-2000-0000733 | | 1/2000 | |
| KR | 10-2004-003842 | | 1/2004 | |
| KR | 10-2005-0011414 | | 1/2005 | |

OTHER PUBLICATIONS

English translation of JP 2008016067 A.*
English translation of JP 2003085964 A.*
Korean Office Action issued Oct. 9, 2012, in counterpart Korean Patent Application No. 10-2010-0104247 (4 pages, in Korean).

* cited by examiner

*Primary Examiner* — Nathan Danielsen
(74) *Attorney, Agent, or Firm* — NSIP Law

(57) ABSTRACT

A disk drive that includes a noise reduction unit, and a method of reducing noise by using the disk drive. The disk drive includes a main chassis; a tray operatively coupled to the main chassis such that the tray is slidable relative to the main chassis, the tray including a disk accommodation portion configured to accommodate a storage medium such that the storage medium is rotatable relative to the disk accommodation portion; and a noise reduction unit configured to reduce a pressure concentration on an end portion of the storage medium as the storage medium rotates to reduce noise.

29 Claims, 9 Drawing Sheets

DISK DRIVE INCLUDING A NOISE REDUCTION UNIT AND METHOD OF REDUCING NOISE BY USING THE DISK DRIVE

CROSS-REFERENCE TO RELATED PATENT APPLICATION

This application claims the benefit of Korean Patent Application No. 10-2010-0104247, filed on Oct. 25, 2010, in the Korean Intellectual Property Office, the entire disclosure of which is incorporated herein by reference for all purposes.

BACKGROUND

1. Field

The following description relates to disk drives, and additionally, to disk drives configured to reduce noise of a specific frequency band generated when a disk rotates, and methods of reducing noise by using the disk drives.

2. Description of the Related Art

The term disk drive may refer to an optical device using an optical pickup to read or write data to a storage medium. For example, the term disk drive may include an optical device that uses an optical pickup to read or write data to a storage medium. Examples of storage mediums are a compact disk having read only memory (CD-ROM), a rewritable compact disk (CD-RW), a digital versatile disk (DVD) and a rewritable digital versatile disk (DVD-RW).

Often, a tray type disk drive, into which a storage medium may be inserted, is used to read or write data to the storage medium. A tray type disk drive that includes a support unit which supports a storage medium is installed in a housing, and the support unit may be ejected from the housing in order to facilitate the insertion and removal of the storage medium. Tray type disk drives are often installed into personal computers. However, because of the interest in integrating personal computer products with television monitors and liquid crystal displays, such personal computer products have undergone rapid development. Data may be read or written to a storage medium through use of a slim type disk drive. A slim type disk drive is often incorporated into a portable computer such as a notebook computer. A slim type disk drive is a disk drive into which a storage medium may be directly inserted. A slim type disk drive has a narrow space for accommodating a storage medium. If the disk rotates at high speed, the narrow space causes a flow of turbulent air, separation of air flows, and a pressure change at an air flow boundary layer on a surface of a disk, thereby generating noise Because noise is caused by a pressure change due to an air flow that occurs if a disk rotates, noise reduction methods have been developed. Such noise reduction methods use a change in an air flow in a limited space inside a disk drive.

In an example of a noise reduction method, air flow is changed by selectively changing the shapes and sizes of components installed in a disk drive. For example, an air flow is changed by changing the diameter of an external circumference of a disk accommodation unit of a tray. As another example, an air flow is changed by changing a size of a pickup base. As a further example, an air flow in a disk drive is changed by using a bead shaped cover.

However, because tray type slim disk drives are designed to reduce thickness and weight, and to have a stable structure, the inner size of the disk drive is likewise reduced and limited. As a result, a bead shaped cover generates touch noise by reducing a gap between an upper surface of a disk and a cover, and disk scratch generated when a tray is open and closed. Because of such touch noise, the use of bead shaped cover is not feasible. In addition, if a cover has a bead shape, manufacturing costs may be increased for maintenance of planarization of the cover due to problems with manufacture of the cover.

SUMMARY

In one general aspect, there is provided a disk drive. The disk drive includes a main chassis, a tray operatively coupled to the main chassis such that the tray is slidable relative to the main chassis, the tray comprising a disk accommodation portion configured to accommodate a storage medium such that the storage medium is rotatable relative to the disk accommodation portion, and a noise reduction unit configured to reduce a pressure concentration on an end portion of the storage medium as the storage medium rotates to reduce noise.

The disk drive may include a noise reduction unit that includes a plurality of air flow holes formed in at least one portion of an outer circumference portion of the disk accommodation portion.

The disk drive may include a noise reduction unit that includes a plurality of air flow holes are formed through the disk accommodation portion.

The disk drive may include a noise reduction unit that includes a plurality of air flow holes each having a circular shape, and are spaced apart from each other by a predetermined interval.

The disk drive may include a noise reduction unit that includes a plurality of air flow holes each having a square shape, and are spaced apart from each other by a predetermined interval.

The disk drive may include a noise reduction unit that includes a plurality of air flow holes each having a rectangular shape, and are spaced apart from each other by a predetermined interval, and the plurality of air flow holes may be disposed such that long sides of rectangular shapes are positioned in parallel to each other.

The disk drive may include a noise reduction unit that includes a plurality of air flow holes each have a rectangular shape, and are spaced apart from each other by a predetermined interval, and the plurality of air flow holes may be disposed so that short sides of rectangular shapes are positioned in parallel to each other.

The disk drive may include a noise reduction unit that is disposed inside a disk scratch prevention portion formed along the outer circumference portion of the disk accommodation portion.

The disk drive may include a noise reduction unit that is disposed on a side of the tray that faces the main chassis when the tray is inserted into the main chassis.

The disk drive may include a driver integrated circuit (IC) such that if the tray is inserted into the main chassis, the driver IC is disposed below the noise reduction unit.

The disk drive may include a spindle motor for rotating the disk and slidably installed on the tray; and an optical pickup base comprising an optical pickup unit for storing information in or reading information from the disk while linearly reciprocating along a radial direction of the disk.

The disk drive may include a noise reduction unit such that the noise reduction unit reduces noise generated within at least one frequency band.

The disk drive may be included in an electronic device.

The electronic device may be one of one of a portable game console, a portable/personal multimedia player (PMP), a portable lap-top PC, a desktop PC, a high definition television (HDTV), and an optical disc player.

In another aspect, there is provided a disk drive. The disk drive includes a tray slidably installed so as to selectively slide into and out of a cavity formed by combining a main chassis and a cover, the tray comprising a disk accommodation portion configured to accommodate a storage medium, and a reduction noise unit comprising a plurality of air flow holes formed through the disk accommodation portion, wherein air flows below the tray through the plurality of air flow holes when a storage medium in the disk drive rotates.

The disk drive may include a plurality of air flow holes that are formed inside a disk scratch prevention portion along an outer circumference portion of the disk accommodation portion.

The disk drive may include a plurality of air flow holes each have a circular shape, and are spaced apart from each other by a predetermined interval.

The disk drive may include a plurality of air flow holes each have a square shape, and are spaced apart from each other by a predetermined interval.

The disk drive may include a plurality of air flow holes that each have a rectangular shape, and that are spaced apart from each other by a predetermined interval. The plurality of air flow holes may be disposed such that sides having the same length of rectangular shapes are positioned in parallel to each other.

The disk drive may include a noise reduction unit that is disposed on the disk accommodation unit and a driving drive IC that is disposed below the noise reduction unit if the tray is inserted into a space formed between the tray and the cover.

The disk drive may be included in an electronic device.

The electronic device may be one of one of a portable game console, a portable/personal multimedia player (PMP), a portable lap-top PC, a desktop PC, a high definition television (HDTV), and an optical disc player.

In another aspect, there is provided a method of reducing noise of a disk drive. The method includes reducing a pressure concentration on an end portion of a disk by forming a plurality of air flow holes through a disk accommodation portion of a tray, through which air flows below the tray when a storage medium in the disk drive rotates.

The disk drive may include a plurality of air flow holes that are formed inside a disk scratch prevention portion along an outer circumference portion of the disk accommodation portion.

The disk drive may include a plurality of air flow holes that each have a circular shape, and that are spaced apart from each other by a predetermined interval.

The disk drive may include a plurality of air flow holes that each have a square shape, and that are spaced apart from each other by a predetermined interval.

The disk drive may include a plurality of air flow holes that each have a rectangular shape, and that are spaced apart from each other by a predetermined interval. The plurality of air flow holes may be disposed such that sides having the same length of rectangular shapes are positioned in parallel to each other.

The disk drive may include a driver integrated circuit (IC) such that if the tray is inserted into the main chassis, the driver IC is disposed below the noise reduction unit.

The method may reduce noise generated within at least one frequency band.

Other features and aspects may be apparent from the following detailed description, the drawings, and the claims.

Figure 1:
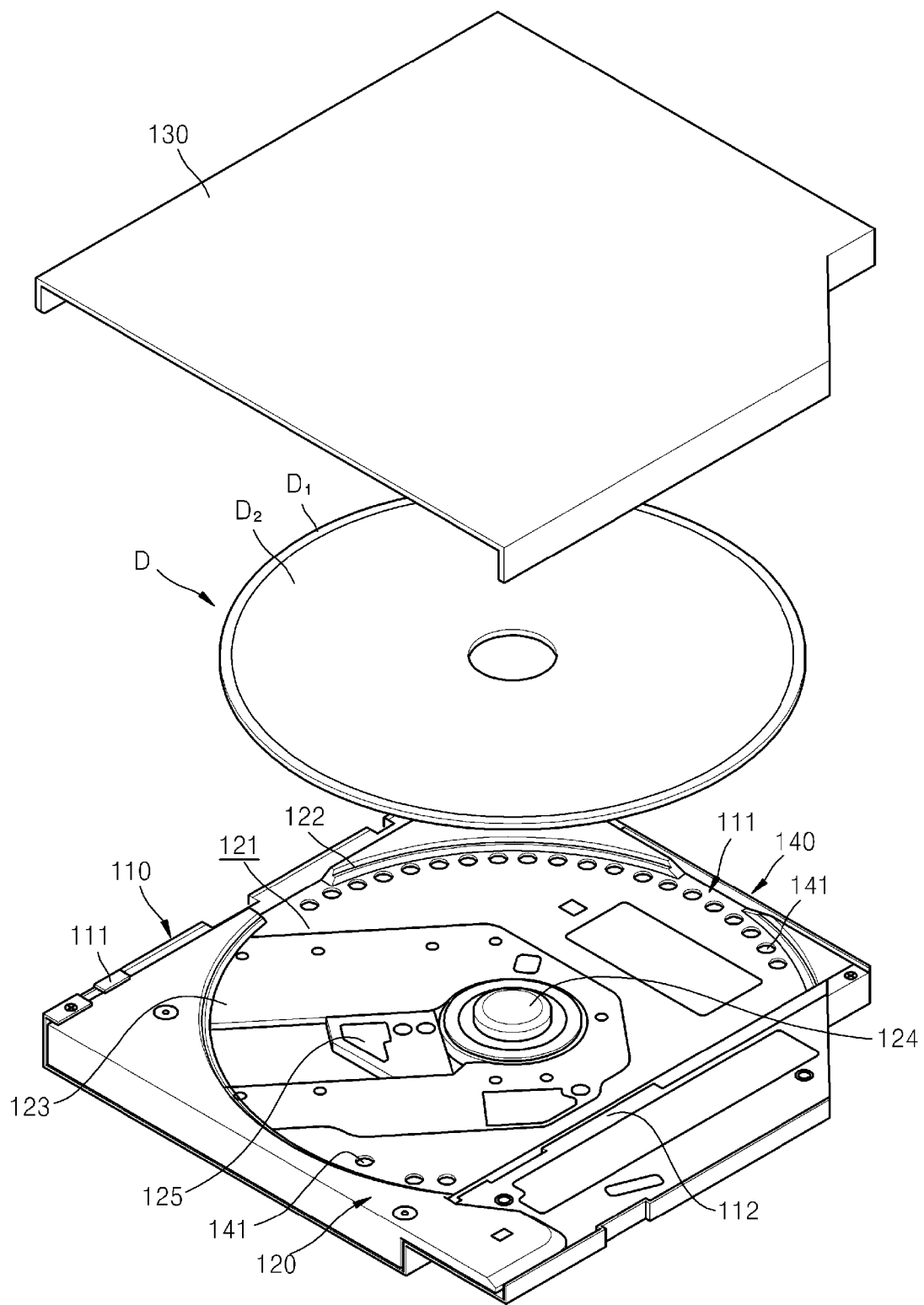
FIG. 1 is a diagram illustrating an example of a disk drive that includes a noise reduction unit.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 2:
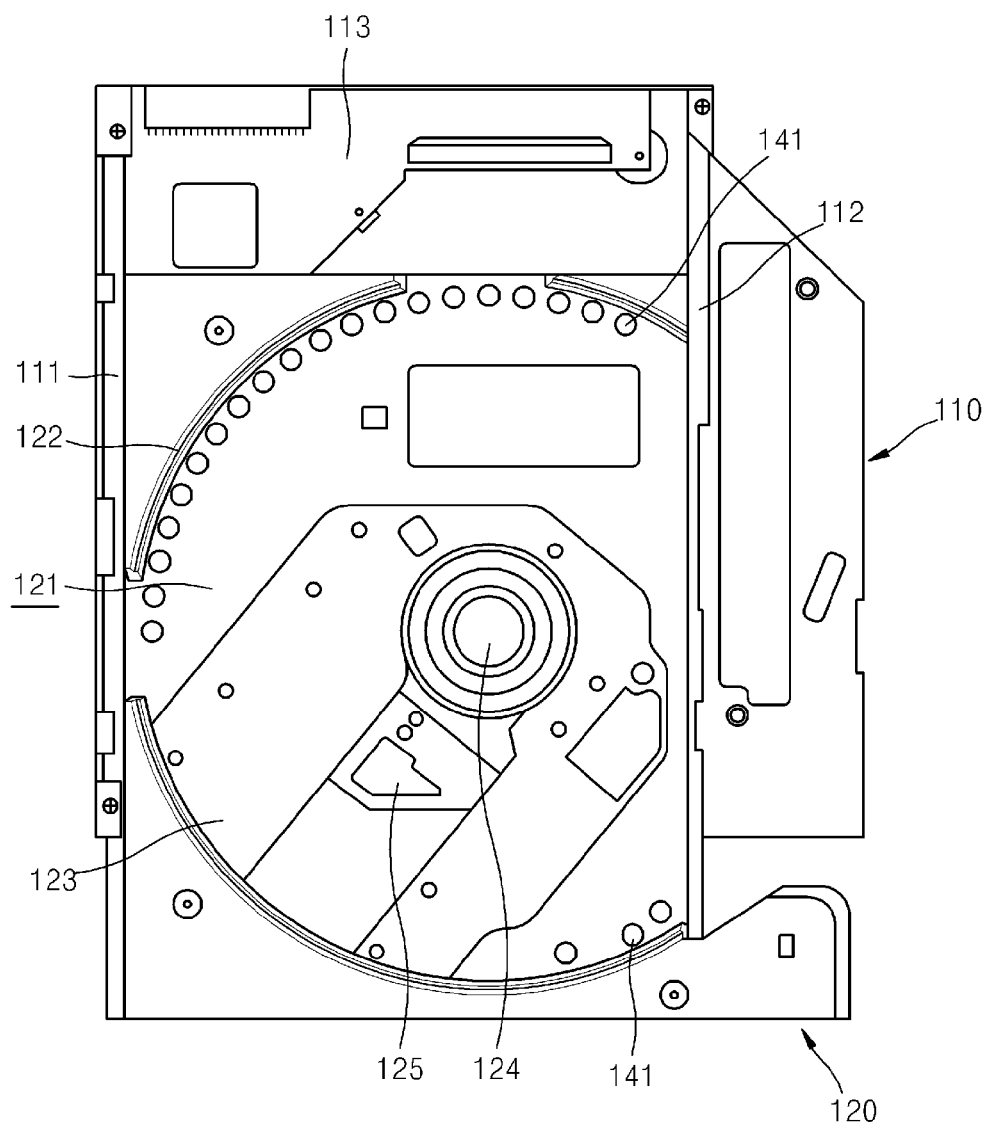
FIG. 2 is a diagram illustrating an example of a tray of a disk drive inserted into a main chassis of the disk drive.
Figure 3:
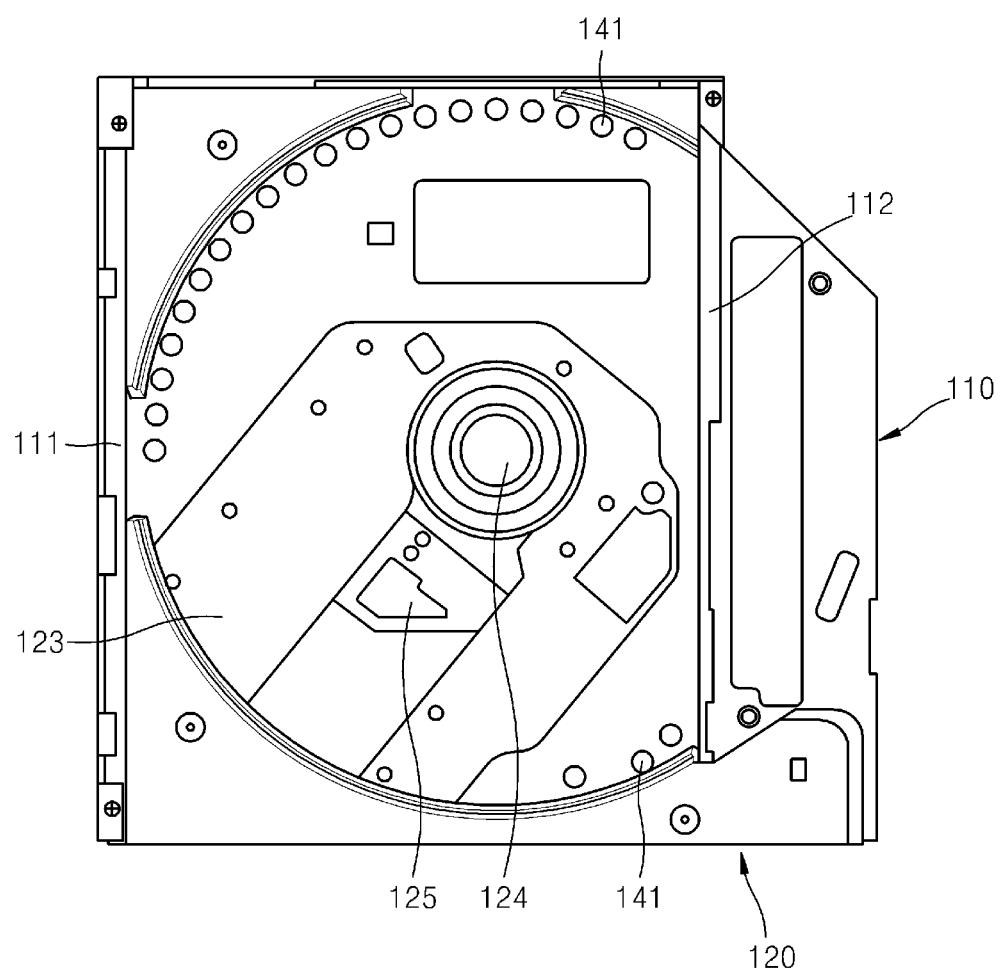
FIG. 3 is a diagram that illustrates an example of a tray of a disk drive inserted into a main chassis of the disk drive.

FIG. 1 is a diagram that illustrates an example of a disk drive 100 that includes a noise reduction unit 140. FIG. 2 is a diagram illustrating an example of a case by which a tray 120 of the disk drive 100 may be inserted into a main chassis 110 of the disk drive 100. FIG. 3 is a diagram illustrating an example of a case by which a tray 120 may inserted into the main chassis 110.

Referring to FIGS. 1 through 3, the disk drive 100 includes the main chassis 110, a tray 120, and a cover 130 configured to cover an upper portion of the main chassis 110 so as to define an inner space between the cover 130 and the main chassis 110. For example, the tray 120 may be slidably installed on the main chassis 110. The tray may be configured such that a user may insert or eject the tray 120 from the main chassis 110. The tray includes a disk accommodation unit 121 that is configured to accommodate a storage medium. For example, the storage medium may be a disk D.

As an example, guide rails 111 and 112 may be formed on two sides of the main chassis 110. The guide rails 111 and 112 may be formed on opposing sides of the main chassis 110. The tray 120 is operatively coupled to the main chassis 110 so as to facilitate sliding of the tray between an inserted and an ejected position. For example, the tray 120 may be slidably coupled to the guide rails 111 and 112 in such a way that the tray 120 is able to be inserted into and ejected from the main chassis 110.

A disk scratch prevention unit 122 is formed on an edge portion of the disk accommodation portion 121 in order to support a non-information region D1 formed along an edge portion (an outer circumference portion) of the storage medium so as to prevent an information region D2 of the storage medium from being scratched. For example, the disk scratch prevention unit may be formed on an outer circumference portion of the disk accommodation portion 121. As an example, the storage medium may be a disk D. Disk D is a disk such as a CD-ROM, CD-RW, DVD, DVD-RW, BLU-RAY disc (BD), or the like. The non-information storage region D1 is formed along an outer circumference portion of the disk D. The information storage region D As an example, the tray 120 may be detachable from the main chassis 110. The tray 120 includes a spindle motor 124 that is configured to rotate the storage medium (e.g., disk D) if the storage medium (e.g., disk D) is accommodated in the disk accommodation unit 121. The tray 120 also includes a pickup base 123 having a pickup unit 125 (e.g., an optical pickup unit) that is configured to record information to or read information from the storage medium (e.g., disk D). The pickup unit 125 moves relative to the storage medium. As the pickup unit 125 moves, the pickup unit 125 records and reads information from the storage medium. For example, if the storage medium is a disk D, the pickup unit 125 linearly reciprocates along a radial direction of the disk D.

The disk drive 100 includes the noise reduction unit 140 that is configured to inhibit or otherwise prevent a pressure concentration on the edge portion of the storage medium. For example, if the storage medium is a disk D, the noise reduction unit 140 inhibits or prevents a pressure concentration on the outer circumference portion of the disk D. The noise reduction unit 140 reduces noise of a specific frequency band during rotation of the disk D.

For example, the noise reduction unit 140 may include a plurality of air flow holes 141 that are formed through the disk accommodation portion 121. The plurality of air flow holes 141 may be formed along and inside the disk scratch prevention portion 122 formed on the disk accommodation portion 121.

The noise reduction unit 140 may be formed on both (i) a side of the tray 120 that is furthest inserted into the disk drive 100 if the tray 120 is in an inserted position, and (ii) a space formed at a portion exposed outside the main chassis 110. As an example, the noise reduction unit 140 may be formed on only the side of the tray 120 corresponding to that side of the tray 120 which is furthest inserted into the disk drive 100 if the tray 120 is in an inserted position. The noise reduction unit 140 may be solely formed on such a side of the tray 120 because a pressure generated as the storage medium (e.g., disk D) rotates is concentrated on such a side of the tray 120.

The air flow holes 141 may each have a circular shape, and may be spaced apart from each other by a predetermined interval. The main chassis 110 may include an integrated circuit (IC) operatively coupled thereto such that if the tray 120 is completely inserted into the main chassis 110, the driver integrated circuit (IC) 113 is disposed below the air flow holes 141 (refer to FIGS. 2 and 3). The arrangement of the air flow holes 141 is not limited to the arrangements illustrated in FIGS. 2 and 3. For example, the air flow holes 141 may not be spaced apart from each other by a predetermined interval, and may be spaced apart from each other by different intervals. As another example, the air flow holes 141 may each have a square shape.

As the storage medium (e.g., disk D) is rotated by the spindle motor 124, air around the storage medium (e.g., disk D) flows through the air flow holes 141 towards the driver IC 113 below the tray 120. Thus, heat generated by the driver IC 113 may be transferred away from the driver IC 113 by air flowing through the air flow holes 141.

Figure 4:
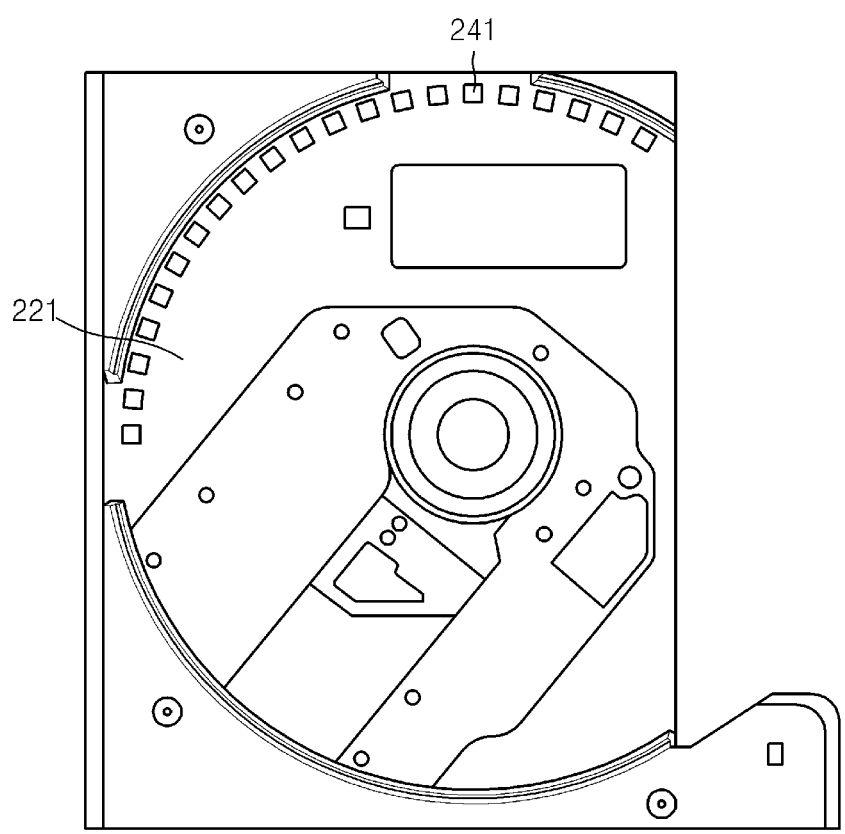
FIG. 4 is a diagram illustrating an example of a disk drive that includes a noise reduction unit.
Figure 5:
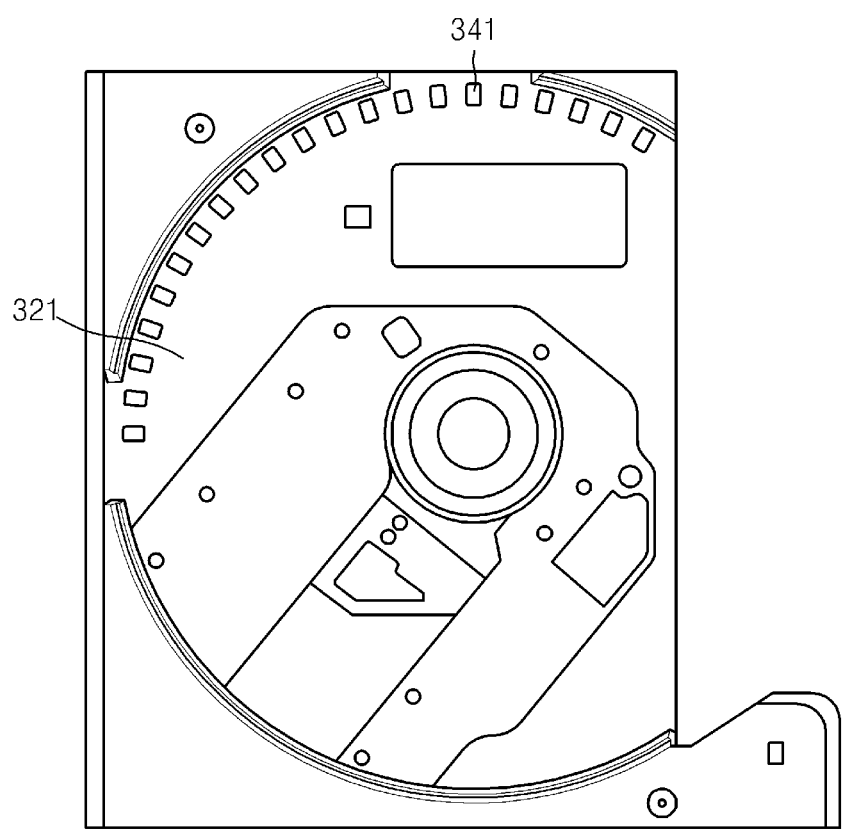
FIG. 5 is a diagram illustrating an example of a disk drive that includes a noise reduction unit.
Figure 6:
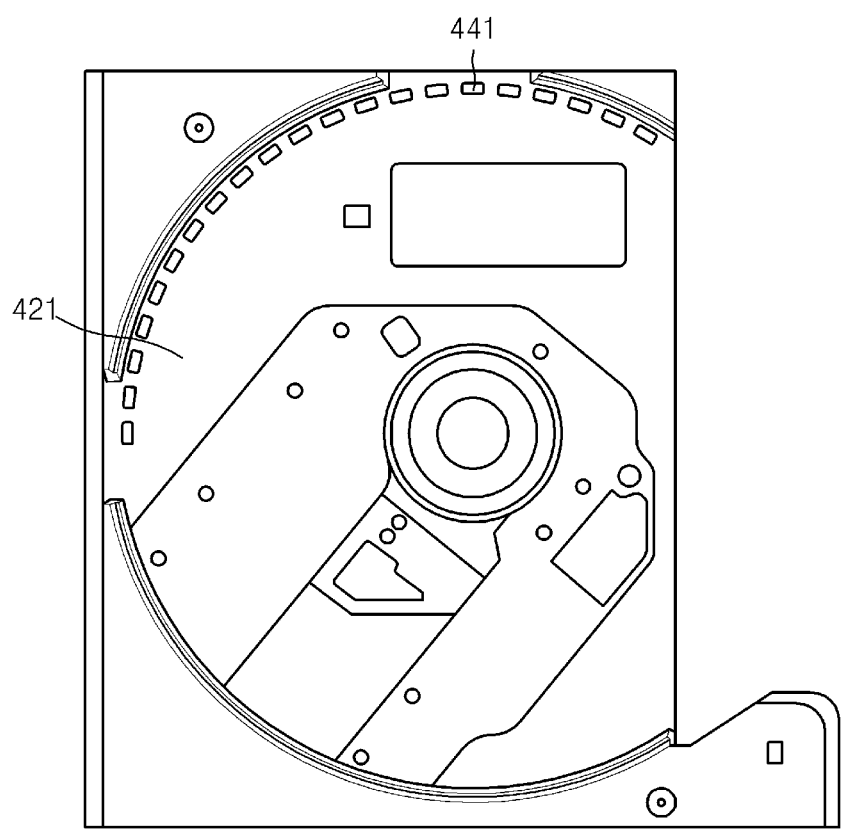
FIG. 6 is a diagram illustrating an example of a disk drive that includes a noise reduction unit.

FIG. 4 is a diagram illustrating an example of a disk drive that includes a noise reduction unit FIG. 5 is a diagram illustrating an example of a disk drive that includes a noise reduction unit. FIG. 6 is a diagram illustrating another example of a disk drive that includes a noise reduction unit.

Referring to FIG. 4, a disk accommodation portion 221 has a plurality of air flow holes 241 formed therein. The plurality of air flow holes 241 are spaced apart from each other by a predetermined interval along an edge portion (e.g., an outer circumference portion) of the disk accommodation portion 221. Each of the plurality of air flow holes 241 has a square shape.

Referring to FIG. 5, a disk accommodation portion 321 has a plurality of air flow holes 341 formed therein. The plurality of air flow holes 341 are spaced apart from each other by a predetermined interval along an edge portion (e.g., an outer circumference portion) of a disk accommodation portion 321. Each of the plurality of air flow holes 341 has a rectangular shape. The plurality of air flow holes 341 are disposed in the disk accommodation portion 321 such that the long sides of the rectangular-shaped air flow holes 341 are positioned substantially parallel to each other.

Referring to FIG. 6, a disk accommodation portion 421 has a plurality of air flow holes 441 formed therein. The plurality of air flow holes 441 are spaced apart from each other by a predetermined interval along an edge portion (e.g., an outer circumference portion) of the disk accommodation portion 421. Each of the plurality of air flow holes 441 has a rectangular shape. The plurality of air flow holes 441 are disposed in the disk accommodation portion 421 such that the short sides of the rectangular-shaped air flow holes 441 are positioned relatively parallel to each other.

The arrangements of the air flow holes 241, 341, and 441 are not limited to as shown in FIGS. 4 through 6. For example, the air flow holes 241, 341, and 441 may be spaced apart from each other so as not to be disposed at predetermined intervals. In other words, the distance between respective air flow holes 241, 341, and 441 may be different or varying.

The shapes of the air flow holes 241, 341, and 441 are not limited to a circular shape, a square shape, and a rectangular shape, as described above. For example, the air flow holes 241, 341 and 441 may each have any shape and function. The air flow holes 241, 341, and 441 enable or facilitate air to flow below a tray and through the disk accommodation portions 221, 321, and 421 as a storage medium (e.g., a disk) rotates.

Figure 7:
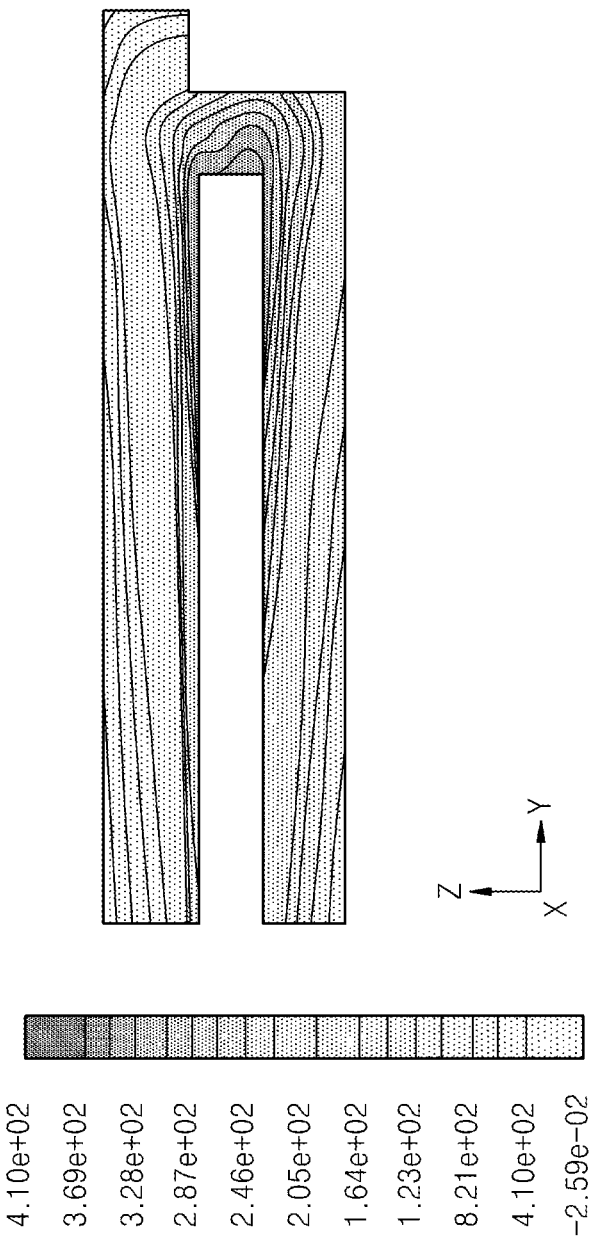
FIG. 7 is a diagram that illustrates a pressure distribution in a conventional disk drive as a storage medium (e.g., a disk) in the disk drive rotates.
Figure 8:
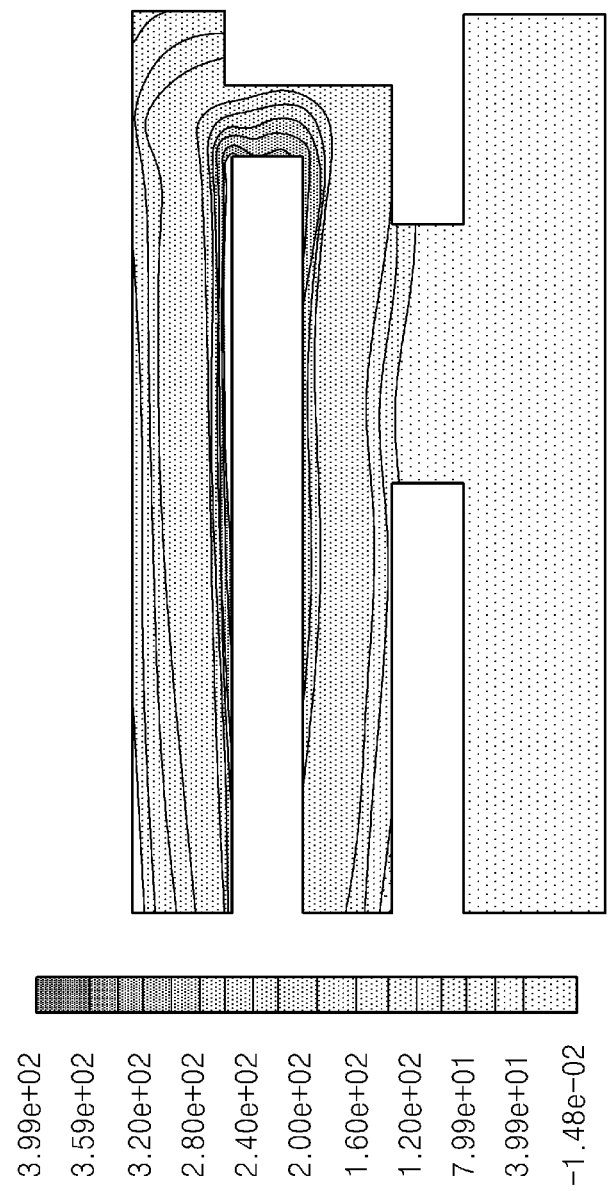
FIG. 8 is a diagram that illustrates a pressure distribution in an example of a disk drive that includes a noise reduction unit and that reduces noise as a storage medium (e.g., a disk) in the disk drive rotates.

FIG. 7 illustrates a pressure distribution in a conventional disk drive as a storage medium (e.g., a disk) in the disk drive rotates. FIG. 8 illustrates a pressure distribution in a disk drive that includes a noise reduction unit as a storage medium (e.g., a disk) in the disk drive rotates.

Referring to FIGS. 7 and 8, as a disk drive (e.g., a slim type disk drive) rotates a storage medium at a high speed, a complex air flow is formed. Specifically, air flows in a spiral shape on a surface of a storage medium (e.g., a disk) due to the Coriolis effect and a viscous flow in a boundary layer. Air flows outwards from a central axis, towards an edge portion of a disk accommodation portion, and then back to the central axis in order to compensate for a reduced air layer near the disk axis of the storage medium (e.g., disk).

Referring to FIG. 7, in a conventional disk drive, as a disk therein rotates, there is a pressure concentration on an end portion of the disk and thus noise is generated.

Referring to FIG. 8, in a disk drive that includes a noise reduction unit as described above. For example, as described above with regard to FIG. 1., as a storage medium (e.g., a disk), which is disposed in a disk drive, rotates, a pressure concentration on an end portion of the storage medium is less than that of the case of the conventional disk drive. As the disk rotates, air flows below a tray through a plurality of air flow holes. Such air flow thereby inhibits or prevents air from being concentrated on the end portion of the storage medium (e.g., the disk). In other words, air on the end portion of the storage medium (e.g., the disk) flows below the tray through the air flow holes to inhibit or prevent air from being concentrated on the end portion of the storage medium (e.g., the disk).

Figure 9:
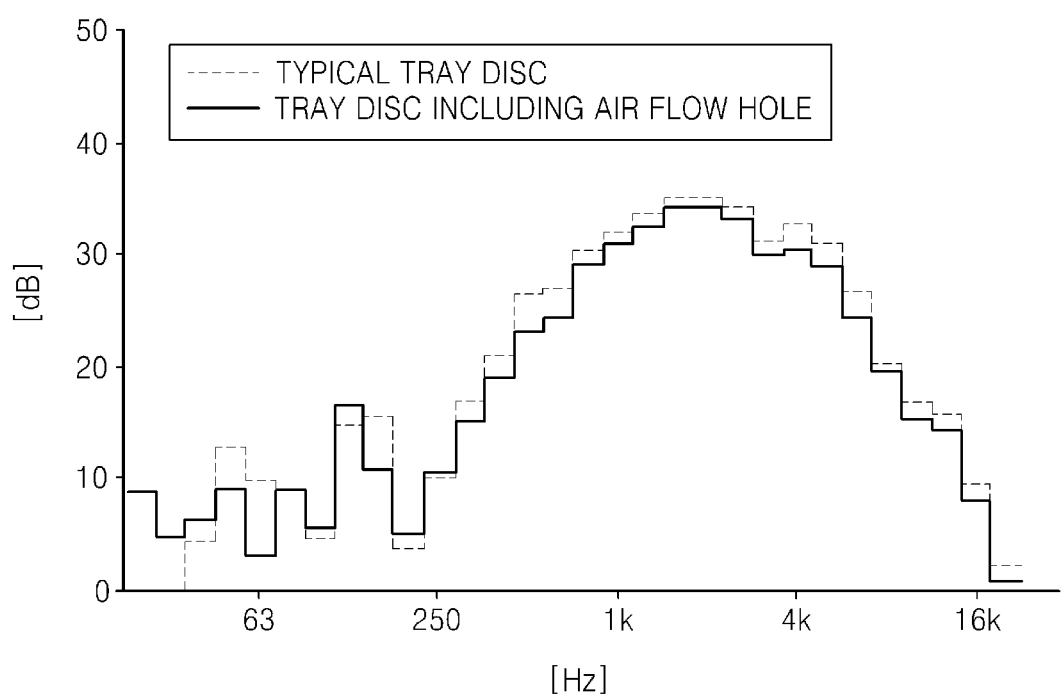
FIG. 9 is a graph that illustrates a comparison of noise levels between a conventional disk drive and a disk drive that a noise reduction unit.

FIG. 9 is a graph that illustrates comparison of noise levels between a conventional disk drive and a disk drive that includes a noise reduction unit. The graph illustrates the noise level generated as a function of frequency.

As illustrated in FIG. 9, a dotted line corresponds to the noise level generated as a conventional disk drive as a function of a frequency band. A solid line corresponds to the noise level generated as a function of the frequency band as a disk drive, that includes a noise reduction unit, rotates.

Although the noise level of the disk drive according to an aspect is higher than that of a conventional disk drive in some frequency bands, the noise level of the disk Drive according to an aspect is lower than that of the conventional disk drives in most frequency bands.

In some examples a disk drive includes a noise reduction unit that minimizes noise generated as a disk rotates in a tray-type slim disk drive and that facilitates a smooth air flow to a driver integrated circuit (IC) to obtain heat dissipation effects.

The disk drive may be included in an electronic device. As a non-exhaustive illustration only, an electronic device described herein may refer to mobile devices such as a digital camera, a portable game console, a portable/personal multimedia player (PMP), a portable lap-top PC, and devices such as a desktop PC, a high definition television (HDTV), an optical disc player, a setup box, and the like capable of wireless communication or network communication consistent with that disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A disk drive comprising:
a main chassis;
a tray operatively coupled to the main chassis such that the tray is slidable relative to the main chassis, the tray comprising a disk accommodation portion configured to accommodate a storage medium such that the storage medium is rotatable relative to the disk accommodation portion; and
a noise reduction unit configured to reduce a pressure concentration on an end portion of the storage medium in response to the storage medium rotating to reduce noise, wherein
the noise reduction unit is formed on a rear side of the tray that is configured to be furthest inserted into the disk drive, and in a semicircular pattern spaced from an outer edge portion of the disk accommodation portion and corresponding to a location of an outermost circular edge of the storage medium, and
the noise reduction unit comprises air flow holes disposed along an interior of a disk scratch prevention portion formed along an outer circumference portion of the disk accommodation portion, the air flow holes extending past boundaries of a continuous section of the disk scratch prevention portion on both sides of the continuous section.

2. The disk drive of claim 1, wherein the air flow holes are formed through the disk accommodation portion.

3. The disk drive of claim 2, wherein each air flow hole of the air flow holes has a circular shape, and the air flow holes are spaced apart from each other by a predetermined interval.

4. The disk drive of claim 2, wherein each air flow hole of the air flow holes has a square shape, and the air flow holes are spaced apart from each other by a predetermined interval.

5. The disk drive of claim 2, wherein each air flow hole of the air flow holes has a rectangular shape, the air flow holes are spaced apart from each other by a predetermined interval, and the air flow holes are disposed such that long sides of the rectangular shapes are positioned in parallel to each other.

6. The disk drive of claim 2, wherein each air flow hole of the air flow holes has a rectangular shape, and the air flow holes are spaced apart from each other by a predetermined interval, wherein the air flow holes are disposed so that short sides of the rectangular shapes are positioned in parallel to each other.

7. The disk drive of claim 1, wherein the noise reduction unit is disposed on a side of the tray that faces the main chassis when the tray is inserted into the main chassis.

8. The disk drive of claim 1, wherein, in response to the tray being inserted into the main chassis, a driver integrated circuit (IC) is positioned below the noise reduction unit.

9. The disk drive of claim 1, further comprising:
a spindle motor for rotating the storage medium and slidably installed on the tray; and
an optical pickup base comprising an optical pickup unit for storing information in or reading information from the disk while linearly reciprocating along a radial direction of the disk.

10. The disk drive of claim 1, wherein the noise reduction unit reduces noise generated within at least one frequency band.

11. The disk drive of claim 1, wherein the noise reduction unit is configured to reduce pressure on an entire surface of the tray to no greater than 3.99e+02 Pascal.

12. The disk drive of claim 1, wherein the noise reduction unit is only formed on the rear side of the tray that is configured to be furthest inserted into the disk drive, and is not formed along a second continuous section of the disk scratch prevention portion, the second continuous section being formed on a front side of the tray that is configured to be least inserted into the disk drive.

13. The disk drive of claim 1, wherein the disk scratch prevention portion comprises three continuous circular strips disposed on a planar surface that is elevated with respect to the disk accommodation portion and below a top surface of the tray, and the top surface, disk scratch prevention portion, and the disk accommodation portion form a L-shaped cross-section.

14. The disk drive of claim 1, wherein the noise reduction unit comprises air flow holes arranged in a semicircular shape and spaced apart from each other by different intervals.

15. An electronic device, the electronic device including the disk drive of claim 1.

16. The electronic device of claim 15, wherein the electronic device is one of a portable game console, a portable/personal multimedia player (PMP), a portable lap-top PC, a desktop PC, a high definition television (HDTV), and an optical disc player.

17. A disk drive comprising:
a tray slidably installed so as to selectively slide into and out of a cavity formed by combining a main chassis and a cover, the tray comprising a disk accommodation portion configured to accommodate a storage medium; and
a noise reduction unit comprising air flow holes formed through the disk accommodation portion, wherein air flows below the tray through the air flow holes in response to a storage medium in the disk drive rotating, wherein
the air flow holes are formed on a rear side of the tray that is configured to be furthest inserted into the disk drive, and in a semicircular pattern spaced from an outer edge portion of the disk accommodation portion and corresponding to a location of an outermost circular edge of the storage medium and
the air flow holes are disposed along an interior of a disk scratch prevention portion formed along an outer circumference portion of the disk accommodation portion, the air flow holes extending past boundaries of a continuous section of the disk scratch prevention portion on both sides of the continuous section.

18. The disk drive of claim 17, wherein each air flow hole of the air flow holes has a circular shape, and the air flow holes are spaced apart from each other by a predetermined interval.

19. The disk drive of claim 17, wherein each air flow hole of the air flow holes has a square shape, and the air flow holes are spaced apart from each other by a predetermined interval.

20. The disk drive of claim 17, wherein each air flow hole of the air flow holes has a rectangular shape, the air flow holes are spaced apart from each other by a predetermined interval, and the air flow holes are disposed such that sides having the same length of rectangular shapes are positioned in parallel to each other.

21. The disk drive of claim 17, wherein, the noise reduction unit is disposed on the disk accommodation unit and a driving drive IC is disposed below the noise reduction unit in response to the tray being inserted into a space formed between the tray and the cover.

22. An electronic device, the electronic device including the disk drive of claim 17.

23. The electronic device of claim 22, wherein the electronic device is one of a portable game console, a portable/personal multimedia player (PMP), a portable lap-top PC, a desktop PC, a high definition television (HDTV), and an optical disc player.

24. A method of reducing noise of a disk drive, the method comprising reducing a pressure concentration on an end portion of a disk by forming air flow holes through a disk accommodation portion of a tray, through which air flows below the tray when a storage medium in the disk drive rotates, wherein
the air flow holes are formed on a rear side of the tray that is configured to be furthest inserted into the disk drive, and in a semicircular pattern spaced from an outer edge portion of the disk accommodation portion and corresponding to a location of an outermost circular edge of the storage medium and
the air flow holes are disposed along an interior of a disk scratch prevention portion formed along an outer circumference portion of the disk accommodation portion, the air flow holes extending past boundaries of a continuous section of the disk scratch prevention portion on both sides of the continuous section.

25. The method of claim 24, wherein each air flow hole of the air flow holes has a circular shape, and the air flow holes are spaced apart from each other by a predetermined interval.

26. The method of claim 24, wherein each air flow hole of the air flow holes has a square shape, and the air flow holes are spaced apart from each other by a predetermined interval.

27. The method of claim 24, wherein the each air flow hole of the air flow holes has a rectangular shape, the air flow holes are spaced apart from each other by a predetermined interval, and the air flow holes are disposed such that sides having the same length of rectangular shapes are positioned in parallel to each other.

28. The method of claim 24, wherein, when the tray is inserted into a space formed in a main chassis, a driver IC is disposed below the air flow holes.

29. The method of claim 24, wherein the method reduces noise generated within at least one frequency band.

* * * * *